US 7,062,545 B1

(12) United States Patent
Donkin et al.

(10) Patent No.: US 7,062,545 B1
(45) Date of Patent: Jun. 13, 2006

(54) SYSTEM AND METHOD FOR MANAGING DIAL PLATFORM CONFIGURATION

(75) Inventors: Michael Donkin, Howell, NJ (US); Jared Helm, High Ridge, MO (US); Ken C. Snyder, Oakland, MO (US); Joseph M. Tompkins, Newburgh, NY (US); Virginia E. Weismantel, Ringwood, NJ (US)

(73) Assignee: AT&T Corp., New York, NY (US)

( * ) Notice: Subject to any disclaimer, the term of this patent is extended or adjusted under 35 U.S.C. 154(b) by 1144 days.

(21) Appl. No.: 09/680,940

(22) Filed: Oct. 10, 2000

(51) Int. Cl.
*G06F 15/177* (2006.01)
*G06F 15/173* (2006.01)
*G06F 9/44* (2006.01)

(52) U.S. Cl. .............. 709/220; 709/223; 715/736; 717/173; 717/178

(58) Field of Classification Search ........ 709/217–226; 717/168–178, 121–122; 710/72–74, 8–14; 715/733–736; 718/102–103
See application file for complete search history.

(56) References Cited

U.S. PATENT DOCUMENTS

| | | | |
|---|---|---|---|
| 5,933,647 A * | 8/1999 | Aronberg et al. ............ 717/178 |
| 6,289,551 B1 * | 9/2001 | Basile ............................ 15/320 |
| 6,351,819 B1 * | 2/2002 | Berglund et al. ............ 713/310 |
| 6,360,255 B1 * | 3/2002 | McCormack et al. ....... 709/221 |
| 6,401,238 B1 * | 6/2002 | Brown et al. ................ 717/177 |
| 6,493,594 B1 * | 12/2002 | Kraml .............................. 700/19 |
| 6,681,391 B1 * | 1/2004 | Marino et al. ............... 717/175 |
| 6,691,300 B1 * | 2/2004 | Alexander et al. .......... 717/113 |
| 6,894,802 B1 * | 5/2005 | Biondi et al. ............... 358/1.16 |

OTHER PUBLICATIONS

Stowe, M. "Service Management for the Advanced Intelligent Network" IEEE GLOBECOM (c) 1991, pp. 1667-1671.*

* cited by examiner

*Primary Examiner*—William C. Vaughn, Jr.
*Assistant Examiner*—Joseph E. Avellino
(74) *Attorney, Agent, or Firm*—Michael Haynes PLC

(57) ABSTRACT

A system and method for managing a configuration of a dial platform. The operating system for the cards can be loaded and the modem chassis can be configured. The process of loading different code to different cards is automated, and the chassis is configured based on information collected from the chassis prior to loading the code. The user interface allows a technician to log into and choose a chassis, and select the type of work to be performed. The choices made by the technicians are tracked. The work is preferably performed during a maintenance window to minimize the impact to the network.

4 Claims, 19 Drawing Sheets

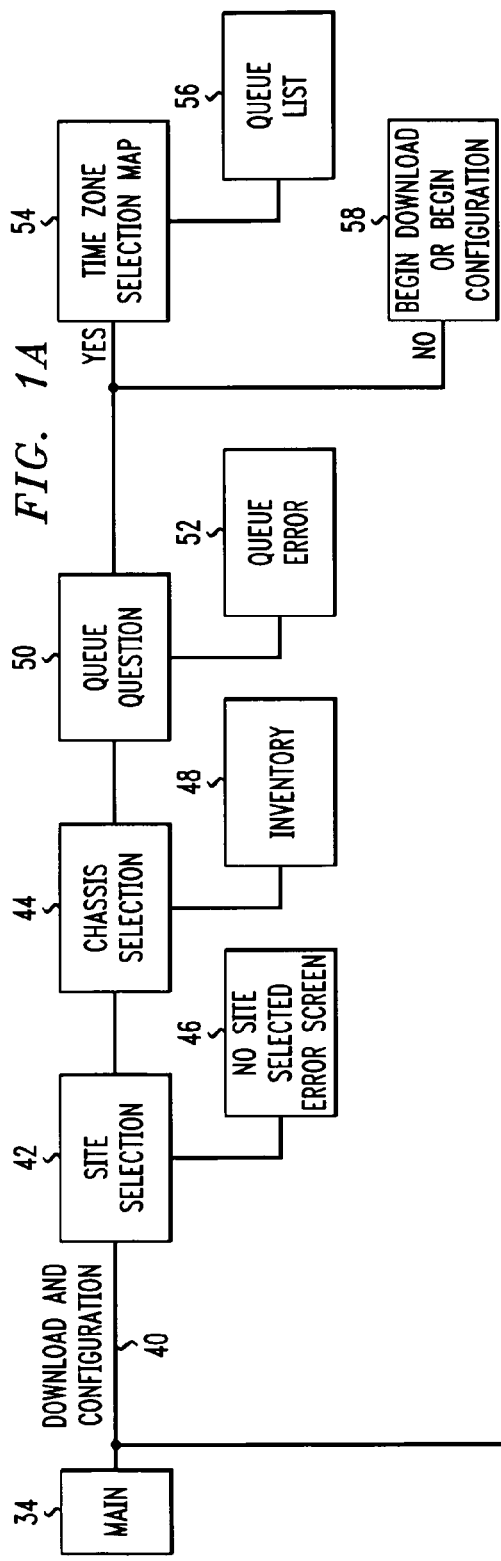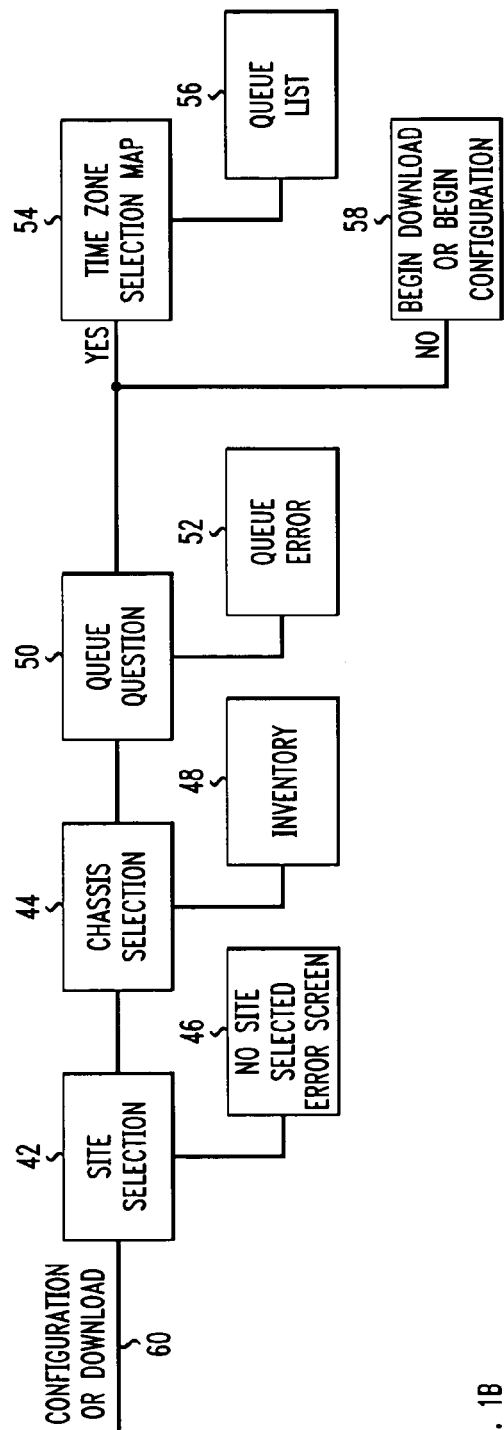
FIG. 1A

FIG. 4

TCM
Configuration Manager

| | | | | | |
|---|---|---|---|---|---|
| ☐ abgmn | ☐ abdky | ☐ aknoh | ☐ albny | ☐ amen1 | ☐ argak | ☐ atiga | ☐ atnve |
| ☐ austx | ☐ baseg | ☐ bfony | ☐ bgtmo | ☐ btma1 | ☐ b1nil | ☐ b1tnd | ☐ bmttx |
| ☐ sacca | ☐ sagtx | ☐ abrcm | ☐ seawa | ☐ sjnpr | ☐ sicut | ☐ sndcn |
| ☐ snfca | ☐ snjca | ☐ snttx | ☐ sokte | ☐ spkwa | ☐ spobr | ☐ snbcm |
| ☐ stkak | ☐ stlmo | ☐ sttvi | ☐ syrny | ☐ temfl | ☐ stafi | ☐ stgch |
| ☐ toyoh | ☐ trbin | ☐ tucas | ☐ tuiok | ☐ whpny | ☐ tcawa | ☐ tkyjp | ☐ tolob |
| | | | | ☐ yokpe | ☐ wntfl | ☐ worme | ☐ wpbfi |

[Submit]

You Have Selected 1 Site nwola

☐ nwola01rs17mr
☐ nwola02rs17mr
☐ nwola03rs17mr
☐ nwola04rs17mr
☐ nwola05rs17mr
☐ nwola06rs17mr
☐ nwola07rs17mr
☐ nwola08rs17mr
☐ nwola09rs17mr nwola10rs17mr evin-Upgrade Required
nwola11rs17mr evin-Upgrade Required
nwola12rs17mr evin-Upgrade Required
nwola13rs17mr evin-Upgrade Required
nwola14rs17mr evin-Upgrade Required
nwola15rs17mr evin-Upgrade Required
nwola16rs17mr evin-Upgrade Required
nwola17rs17mr evin-Upgrade Required nwola02rs17mr

Configuration Type = nwoal
Logging Server No. 1 = 161.230.246.142
Logging Server No. 2 = 161.200.246.150

| SLOT | CARD TYPE | SOFTWARE |
|---|---|---|
| Slot1=3COM PRI-T1/E1 XRC | | 3.0.07 |
| Slot2=3COM Quad V.34 Digital Modem XRC | | 5.10.9 |
| Slot3=3COM Quad V.34 Digital Modem XRC | | 5.10.9 |
| Slot4=3COM Quad V.34 Digital Modem XRC | | 5.10.9 |
| Slot5=3COM Quad V.34 Digital Modem XRC | | 5.10.9 |
| Slot6=3COM Quad V.34 Digital Modem XRC | | 5.10.9 |
| Slot7=3COM Quad V.34 Digital Modem XRC | | 5.10.9 |
| Slot8=3COM Quad V.34 Digital Modem XRC | | 5.10.9 |
| Slot9=3COM Quad V.34 Digital Modem XRC | | 5.10.9 |
| Slot10=3COM Quad V.34 Digital Modem XRC | | 5.10.9 |
| Slot11=3COM Quad V.34 Digital Modem XRC | | 5.10.9 |
| Slot12=3COM Quad V.34 Digital Modem XRC | | 5.10.9 |
| Slot13=3COM Quad V.34 Digital Modem XRC | | 5.10.9 |
| Slot14=3COM High-Density 24 Channel XRC | | 1.2.45 |
| Slot15=3COM High-Density 24 Channel XRC | | 1.2.45 |
| Slot16=3COM BLP or ARC XRC | | 4.1.61 |
| Slot17=3COM Network Management Card with clock | | 5.5.62 |
| Slot21=3COM bellcore Approved Long dis dial Ti NIC | | NA |
| Slot34=3COM T1/E1 IBM NIC | | NA |

You Have Selected 2 Sites psynj psynj_17rs17mr.nelab.els.att.net
psynj_18rs17mr.nelab.els.att.net
psynj_19rs17mr.nelab.els.att.net
psynj_20rs17mr.nelab.els.att.net
psynj_21rs17mr.nelab.els.att.net stlmo stlmo01rs17mr
stlmo02rs17mr
stlmo03rs17mr
stlmo04rs17mr
stlmo05rs17mr
stlmo06rs17mr
stlmo07rs17mr
stlmo08rs17mr
stlmo09rs17mr
stlmo10rs17mr
stlmo11rs17mr
stlmo12rs17mr
stlmo13rs17mr

FIG. 7

```
                            80
                            ↓
┌─────────────────────────────────────────────┐
│           UPGRADE SELECTIONS FOR            │
│       psynj18rs17mr.nelab.els.att.net       │
│                                             │
│  CODE TYPE:                                 │
│                                             │
│  3.1.2B      default     none               │
└─────────────────────────────────────────────┘
```

FIG. 8

```
                            82
                            ↓
┌─────────────────────────────────────────────┐
│  SPAN TYPE:                                 │
│                                             │
│  Slot 1 Span 1 :    channelT1   e1   pri    │
│                                             │
│  Slot 1 Span 2 :    channelT1   e1   pri    │
│                                             │
│  Slot 14 :          channelT1   pri         │
│                                             │
│  Slot 15 :          channelT1   pri         │
└─────────────────────────────────────────────┘
```

FIG. 9a

QUAD T1
CONFIGURATION MENU          84a

CONFIGURATION PARAMETERS :

Slot 1 Available Settings For Span 1

Acknowledgment Wink:   [disabled ▽]

Dial-in/Dial-out Trunk Type:   [AndMTypeII ▽]

Dial-in Address:   [noAddress ▽]

Framing Mode:   [Other ▽]

Line Coding Options:   [Other ▽]

Automated Busy Out:   [disabled ▽]

Dial-in/Dial-out Trunk Signal Start:   [wink ▽]

Pressing OK will change the configuration file. [OK]

FIG. 9b

QUAD E1
CONFIGURATION MENU          84b

CONFIGURATION PARAMETERS :

Slot 1 Available Settings For Span 1

Framing Mode:   [Other ▽]

Line Coding Options:   [Other ▽]

Primary Switch Type Set:   [priSw4ESS ▽]

Call Proceeding/Connect on SETUP Message:   [off ▽]

Pressing OK will change the configuration file. [OK]

FIG. 9c

QUAD PR1
CONFIGURATION MENU                           84c

```
CONFIGURATION PARAMETERS :

Slot 1 Available Settings For Span 1

Framing Mode:       [Other ▽]

Line Coding Options:    [Other ▽]

Primary Switch Type Set:    [priSw4ESS ▽]

Call Proceeding/Connect on SETUP Message:   [off ▽]

Pressing OK will change the configuration file.  [OK]
```

FIG. 9d

HDM T1
CONFIGURATION MENU                           84d

```
CONFIGURATION PARAMETERS :

Slot 14 Available Settings

Signal Mode:    [none ▽]

Ack Wink On Dial In Address Info Received:   [disabled ▽]

Dial In/Out Trunk Start Signal Type:   [wink ▽]

Dial In/Out Trunk Type:    [eAndMTypeII ▽]

Line Coding Options:    [dsxlJB23 ▽]

Dial In Address:    [noAddress ▽]

Framing Mode:    [other ▽]
              Pressing OK will change the configuration file.  [OK]
```

FIG. 9e

HDM PRI
CONFIGURATION MENU         84e

CONFIGURATION PARAMETERS :

Slot 14 Available Settings

Signal Mode: [none ▽]

Line Coding Options: [dsx1JB23 ▽]

Primary Switch Type Set: [priSw4ESS ▽]

Dial In Address [noAddress ▽]

Framing Mode: [other ▽]

Pressing OK will change the configuration file. [OK]

FIG. 10   90

Final Information Needed To Complete
psynj18rs17mr.nelab.els.att.net

Logging Server No. 1: [199.37.199.61]

Logging Server No. 2: [199.37.199.62]

Ev Pool Address For psynj18rs16rt.nelab.els.att.net: [12.71.249.224]

Set Priority

○1  ○2  ●3  ○4  ○5

When Submit button is Pushed Configuration
file will be put in place!

[Submit]

SYSTEM AND METHOD FOR MANAGING DIAL PLATFORM CONFIGURATION

FIELD OF THE INVENTION

The present invention relates to a dial platform configuration manager. More particularly, the present invention relates to a system and method for managing a dial platform so that individual chassis of the dial platform can be upgraded in an expedited fashion. The system and method for managing a dial platform provides the capability of selecting different software for downloading to each chassis, as well as the capability to set various configurations and monitor queue settings. The system and method for managing a dial platform performs tests on each chassis to insure that each chassis is accurate.

BACKGROUND OF THE INVENTION

Modem chassis are used to support multiple cards. A modem chassis typically includes seventeen slots, each of which can accommodate a different configuration of card types. These card types include a Network Management Card (NMC), a Quad Modem Card that has four modems per card, a Hyper Density Modem Card (HDM) that has 24 modems plus the carrier per card, a Hyper Access Router Card (HARC) that routes calls to the network, and a PRI/TI Card that supports two carriers.

Each modem chassis can have different combinations and numbers of some or all of the foregoing cards. As a result maintaining a single configuration for all the shelves network-wide is very difficult.

Due to the differing assortment of cards per chassis, maintaining a single configuration for all of the shelves network-wide was difficult.

Conventionally, technicians load the code for each chassis on a chassis by chassis basis, by bringing up a view of each chassis and selecting the cards to be loaded. This is a time consuming process and required the attention of the technician for the duration of the load.

For each chassis, every setting that needed to be changed was done by single Signaling Network Management Protocol (SNMP) sets, which are not entirely reliable. The process was very time consuming, and resource intensive. There could be as many as 3500+ sets to a chassis. The SNMP set method can take up to 45 minutes or more.

SUMMARY OF THE INVENTION

From the foregoing, there is a need for a system and method for performing loading chassis code quickly and efficiently to a large number of chassis in a timely and cost effective manor.

The system and method for managing a dial platform of the present invention can load code (the operating system for the cards) and can configure the modem chassis, and automates the process of loading different code to different cards, and determines how to configure a chassis based on information collected from the chassis prior to loading the code. The user interface is a web-based application that allows a technician to log into and choose a chassis, and select the type of work to be performed. The choices made by the technicians are tracked in log files.

It is an object of the present invention to provide a system and method for managing a dial platform to upgrade code to multiple chassis quickly and efficiently.

Another object of the present invention is to provide a system and method for managing a dial platform, which maintains a record of changes to each chassis.

Yet another object of the present invention is to provide a system and method for managing a dial platform that minimizes the downtime of the chassis while the chassis code is upgraded.

Still another object of the present invention is to provide a system and method for managing a dial platform in which the chassis code is upgraded during a minimum usage period, and the minimum usage period is dependent upon the time zone in which the chassis is located.

Another object of the present invention is to provide a system and method for managing a dial platform, which reduces the time required to introduce a new code release across the entire platform.

BRIEF DESCRIPTION OF THE DRAWINGS

These and other attributes of the present invention will be described with respect to the following drawings in which:

FIG. 4 is a site selection screen for the flowchart shown in FIG. 1;

FIG. 5 is an inventory screen for the flowchart shown in FIG. 1;

FIG. 6 is a list of chassis at each site for the upgrade process of the flowchart of FIG. 1;

FIG. 7 is a Code Type Selection screen for the upgrade process of the flowchart of FIG. 1;

FIG. 8 is a span type setting screen for the upgrade process of the flowchart of FIG. 1;

FIGS. 9a–9e are Span Parameter Setting screens for each of the five span types for the upgrade process of the flowchart of FIG. 1;

FIG. 10 is a logging server screen for the upgrade process of the flowchart of FIG. 1;

DETAILED DESCRIPTION OF THE INVENTION

Figure 1B:
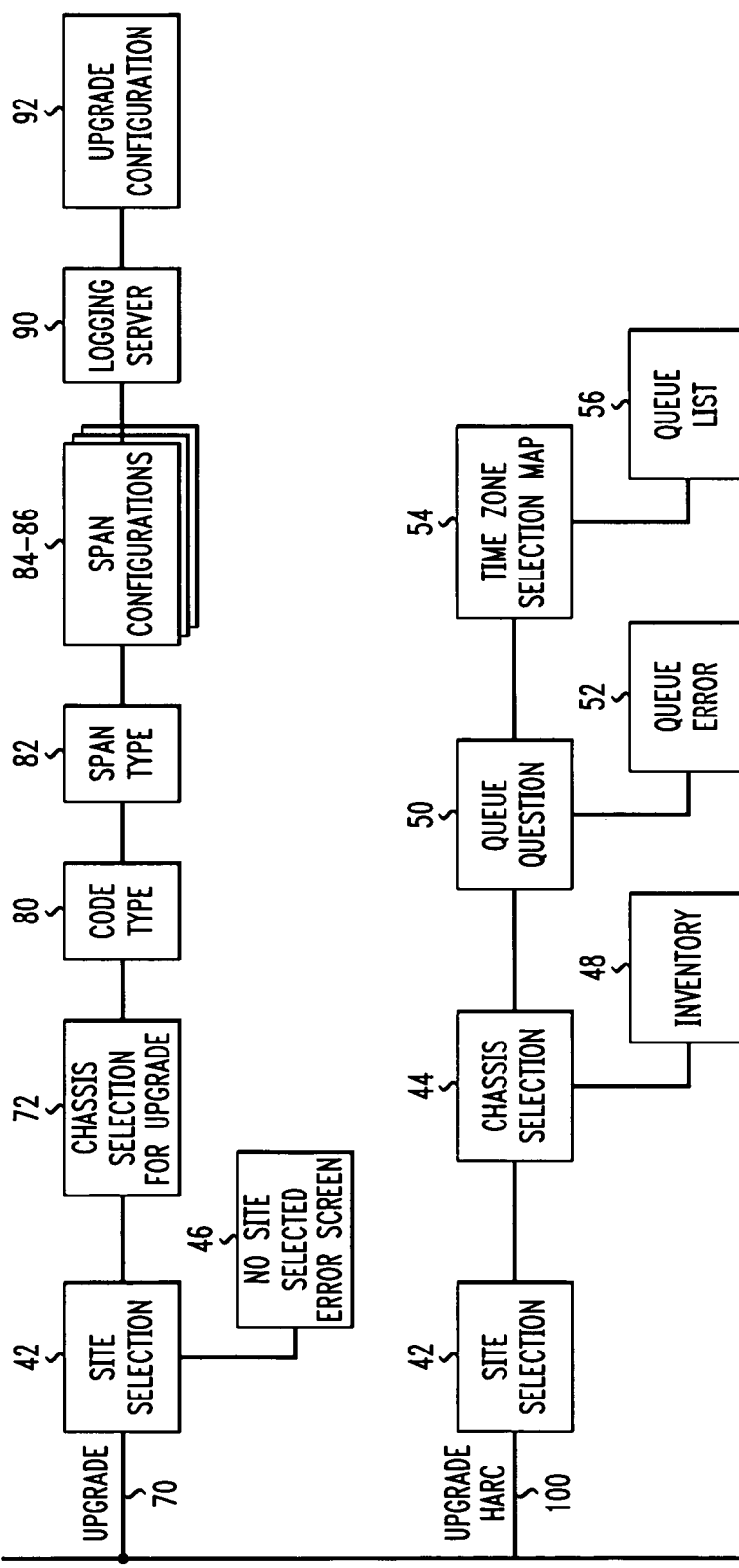
FIG. 1 is flowchart of the user interface screens available in the system and method for managing a dial platform according to the present invention.

A chassis consists of 17 slots that could contain a different configuration of card types such as the Network Management Card (NMC), Quad Modem Card (4 modems per card), Hyper Density Modem Card (HDM has 24 modems plus the carrier), Hyper Access Router Card, (HARC routes calls to the network), and PRI/T1 Cards (this supports 2 carriers).

Due to the differing assortment of cards per chassis, maintaining a single configuration for all of the shelves, network wide is difficult.

When a chassis is added to the network it is provided with a name, which is added to the Domain Name Service (DNS). The dial platform configuration management system does a nightly check for new chassis added to DNS. Until there is a name in DNS, the chassis is not considered manageable. If a new chassis is found, a discovery process is run.

The discovery process queries the chassis for the card types and the arrangement of those card types. It also checks for specific information such as settings that only apply to that chassis. The information is collected and stored on the dial platform configuration management system machine as flat files, which are human readable files, to be referenced later.

Once a chassis has been established on the dial platform configuration management system, the chassis is available to the technicians to start jobs on, such as updating the code to the cards or pushing a configuration to the chassis. The code for the cards is provided by 3Com, for example, and is needed for the card to power up in a usable state. The configuration of a card is the settings on the card that can be changed to improve its performance. These settings are stored in a binary file on the NMC.

The technician can select to update the code on a chassis. The codes available for use are tested and approved by AT&T labs. They are released as a package so that older versions of code are updated with the latest approved version. The dial platform configuration management system allows the technician to launch the job and move onto something else and periodically check on the status of the chassis until it is finished. If the code did not load to a specific card or cards the technician is informed and maintenance can be performed.

The binary file is the main factor in the speed with which the dial platform configuration management system configures chassis. The binary file is the Non Volatile Ram (NVRAM) on the NMC card. This file has all the configurable parameters stored in it and transfers across the network in about 2 minutes. The conventional SNMP set method could take up to 45 minutes or more.

The binary file takes care of the bulk of the configuration. Not all the settings are controlled in this file. The uncontrolled settings are stored in the flat file along with the chassis specific parameters. The flat file is then used as an input into another part of the dial platform configuration management system to configure the remaining sets not handled by the transfer of the binary file. As a result, the number of sets is reduced from 3500 or more to around 150 or less. With such a low number of sets, it is possible to set the parameter and then verify that the parameter was set. The approximate time to configure a chassis is 12 minutes.

After a download and/or configuration job is performed a log file of the job is stored on the machine to be viewed for reference. A checking function is run once a week for each chassis, or can be run by the technician when needed. This checking function checks the code version of each card and the configurable parameters to verify the settings are what they are suppose to be. The results of these checks are stored and used to create reports of the stability of the configuration of chassis across the network.

The user interface for the dial platform configuration management system is all web based and requires a log in to use the tools. This allows for tracking of what was done, when it was done, and who did it for each chassis. The web pages use a combination of perl, CGI, and Javascript. With the use of perl and CGI the web pages require very minimal maintenance. The web pages are updated as the directories on the machine are updated. The dial platform configuration management system is designed to maintain itself. The amount of manpower needed to maintain the machine and application is thus reduced.

The system and method for managing a dial platform of the present invention can be used to deploy major software releases, new TCM chassis configurations, and span type changes. The system and method for managing a dial platform is an application that can run on a Unix machine, for example. He preferred embodiment is designed for a Hewlett-Packard Unix machine (HPUX), but is portable to any Unix environment. The size of the machine is not an issue because the system and method for managing a dial platform if configured correctly can be slaved out to multiple smaller machines. With modifications the system and method for managing a dial platform could effectively run on multiple boxes with different operating systems. Presently, the system and method for managing a dial platform runs on an HP R-class Unix system. This system currently supports all 2500+ modem chassis for the Dial platform and all 180+ modem chassis for Voice over IP. The machine still has room for growth.

Figure 1C:
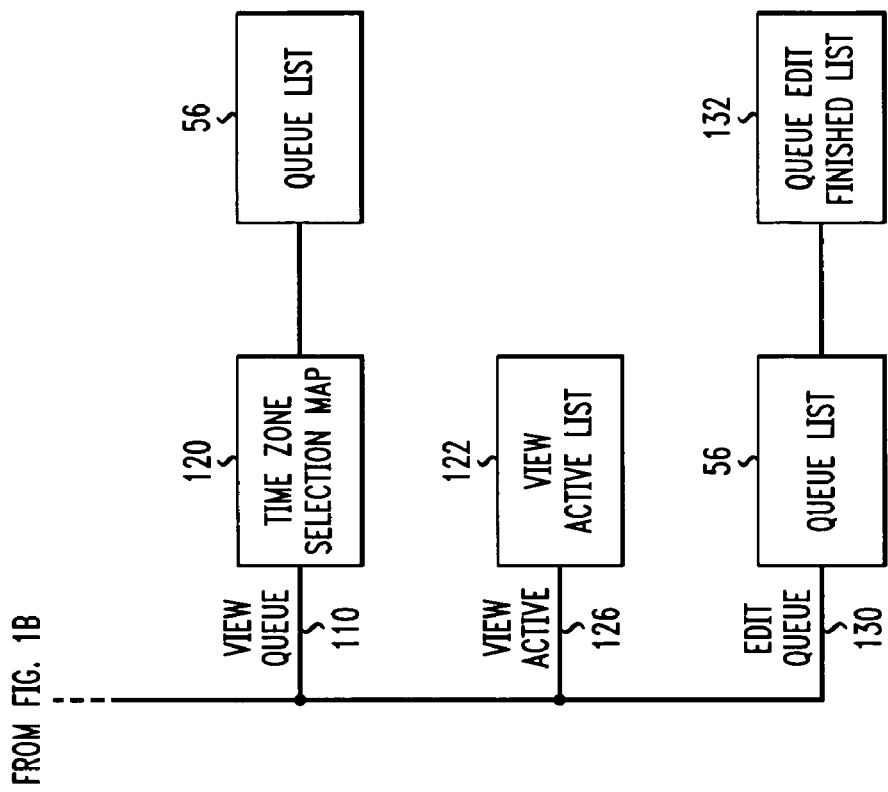
Figure 2A:
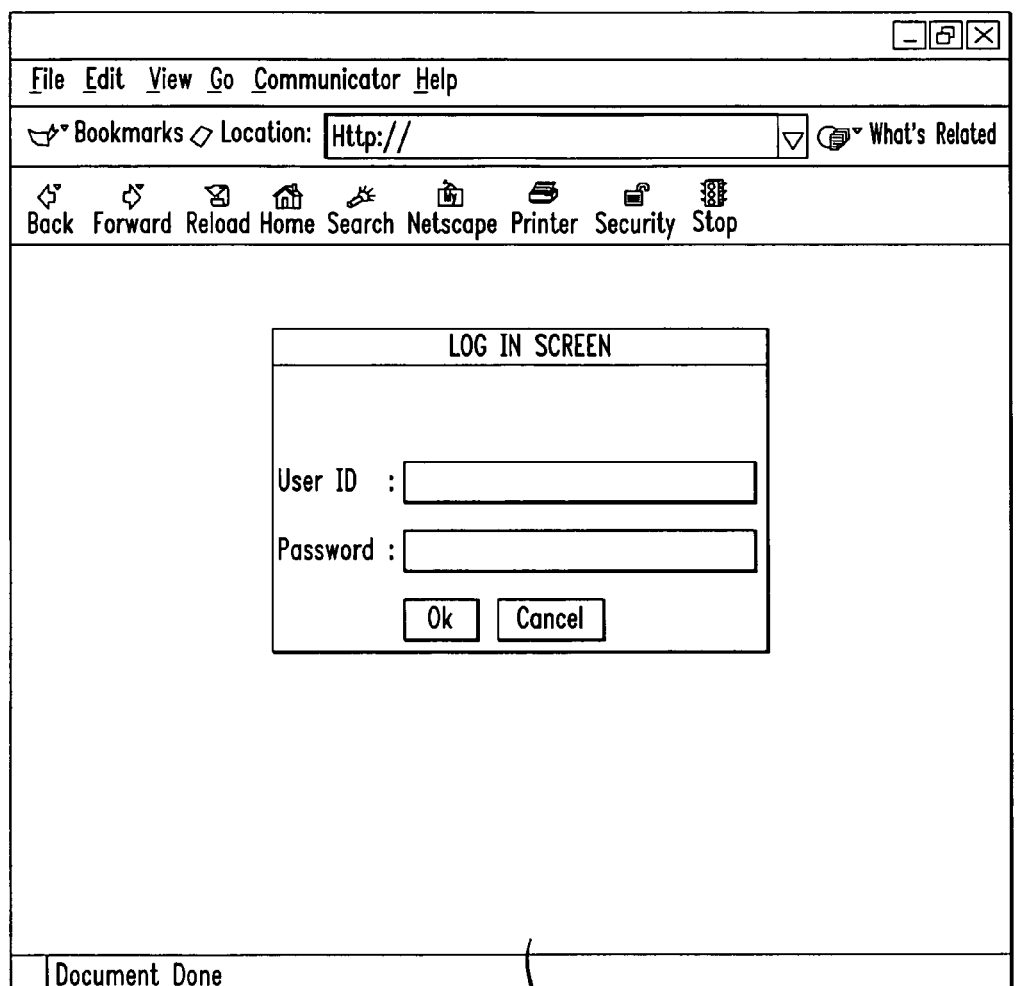
FIGS. 2a and 2b are a login screen and failure screen, respectively, for the flowchart shown in FIG. 1.
Figure 2B:
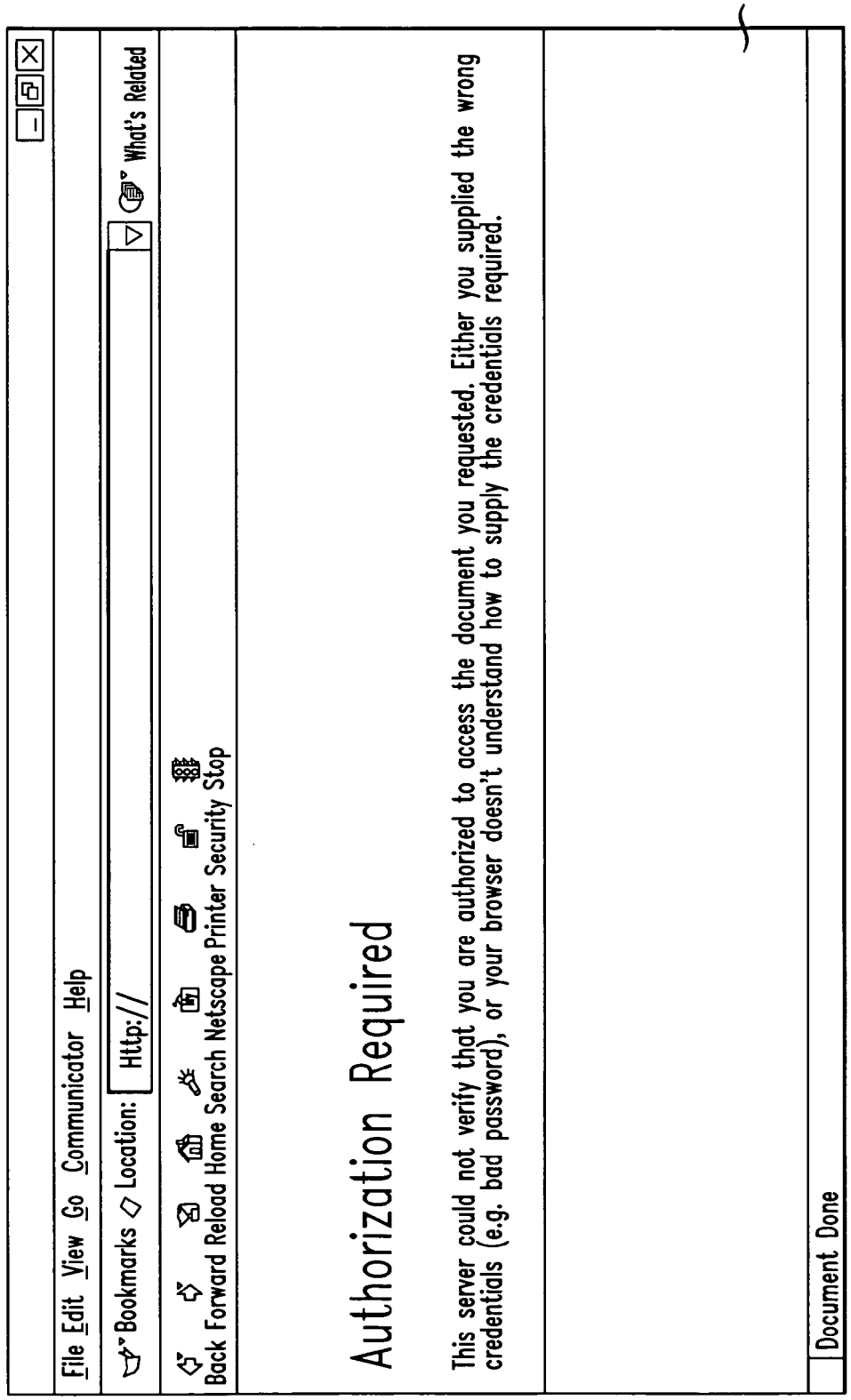
Figure 3:
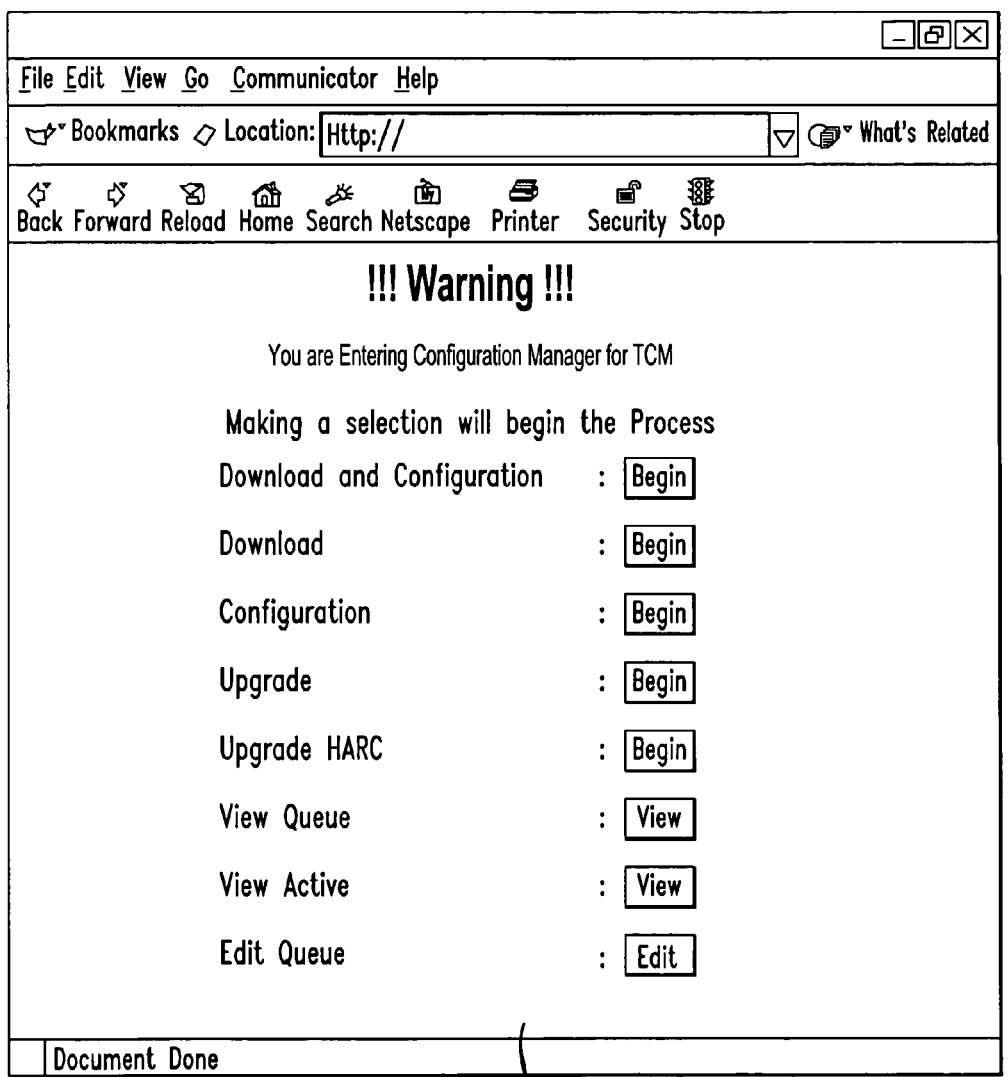
FIG. 3 is a main or opening screen for the flowchart shown in FIG. 1.

Referring to FIG. 1, a flowchart of the user interface screens available in the system and method for managing a dial platform according to the present invention is shown. The user is first presented with a login screen 30 shown in FIG. 2*a*. After entering a user ID and a password, the user is presented with either a failure screen 32, shown in FIG. 2*b*, or the main or opening screen 34, shown in FIGS. 1 and 3. The failure screen 32 is presented when the user ID and/or password are invalid.

The main or opening screen 34 allows the user to choose what activity is to take place. The activities include Download and Configuration; Configuration; Download; Upgrade; Upgrade HARC; View Queue: View Active; and Edit Queue. In FIG. 1, each of these activities is illustrated as a line leading out from the main screen 34.

The Download and Configure option loads software, sets configurations and trap setting based on settings already in a chassis. The Configuration option sets configurations and trap setting as based on settings already in a chassis. The Download option will download software only. The upgrade option loads software, modifies span settings and reconfigures the chassis. The upgrade HARC option loads software, sets configurations using Expect script, and sets trap settings. The View Queue/View Active/Edit Queue options monitor/modify the queue for scheduled work. The trap settings are designed to record the state of a card in the event a task for a card or cards is not completed.

Following line 40 in FIG. 1, once the user has selected the Download and Configure option, the user is presented with the site selection screen 42, shown in detail in FIG. 4. The site selection screen 42 is created from the directory of sites maintained on the host server. The user must check boxes to each site that is to be modified. After the sites are selected the submit button must be selected. After selecting the sites, the user is presented with the chassis selection screen 44. If the user hits the submit button from the site selection screen 42 without selecting a site an error screen 46 is displayed indicating that no site was selected.

After the site locations are selected, the dial platform configuration management system provides a list of chassis at each site in the Inventory screen 48. The number of sites selected in the site selection screen 42 is also displayed. The user can select individual chassis or all of the chassis. The user can then choose to go forward to the Queue Question screen 50, back to the site selection screen 42, or to the opening screen 34.

When the name of a chassis is selected on the chassis selection screen 46, the dial platform configuration management system retrieves the chassis inventory and displays it. As an example FIG. 5 shows the inventory screen 48 for chassis nwola02, which is located in New Orleans (nwola), on $2^{nd}$ chassis (02). In the example shown in FIG. 5, the full identifier is nwola02rsl7mr, which includes the additional information indicating that it is the Roboitics chassis (rs) and the location of the NMC Card in slot 17 (17mr), all information about the chassis is received through the NMC Card.

In the queue question screen 50, the user is given three options if the number of chassis(s) selected is less than five. First the user can choose "yes" to place the chassis(s) in the queue for action during the maintenance window time at the site location. After selecting "yes" a time zone selection map screen 54 and queue list 56 are presented to indicate what time zone the selected chassis are in. By selecting "no" the chassis(s) selected will be placed in the queue for action, to start within five minutes. If more than five chassis are selected in the chassis selection screen 46, the queue question screen is bypassed. The "no" selection also begins the download and configuration in screen 58. The third option is the "go back" button to return to the chassis selection screen 46.

If a secondary activity for a chassis already in the queue is attempted, an error message screen 52 appears to inform the user that the queue must be edited. The error message screen 52 gives the user two options. First the user can remove the previously scheduled chassis(s) from the queue. Second, the user can leave the previously scheduled chassis in the queue with the earlier requested changes to run.

At queue time, the dial platform configuration management system will read the unique trunk settings on the chassis; obtain the trap destinations; the NMC logging addresses, and EV addresses from the EV database; download the currently released software to each card, one card type at a time; reset the CODE II type cards such as the HDSPs and the HARCs; restore the default settings on each card; configure all cards and set trap destinations; save to NVRAM for each card; and reset each card type. CODE II type cards are cards that can be loaded with code without interrupting services, and the code will not take affect until the cards is rebooted.

Line 60 in FIG. 1 shows the screens presented for the both of the download or configuration options. The opening screen 34, site selection screen 42, chassis selection screen 46, queue question screens open sequentially in the same manner as described above for the Download and Configure option.

For the Download option, the dial platform configuration management system downloads the currently released software to each card, one card type at a time, and then resets each card type.

For the Configuration option, the dial platform configuration management system reads the unique trunk settings on the chassis; obtains the trap destinations; the NMC logging addresses, and EV addresses from the EV database; resets the CODE II type cards such as the HDSPs and the HARCs; restores the default settings on each card; configures all cards and set trap destinations; saves to NVRAM for each card; and resets each card type.

Line 70 depicts the screens for the Upgrade option. In the upgrade process the user must select the site and chassis to be modified, select if or which software code version should be loaded, select the span type and configuration parameters for each span chassis, supply the logging addresses and EV pool address, and submit the work to the queue.

The site selection screen 42 is the same as the Download and Configure option. After the site location is selected, the dial platform configuration management system provides a list 72 of chassis at each site, as shown in FIG. 6. The number of sites selected in the site selection screen is displayed at the top. At this point the user has three options. First, the user can select the chassis name, which will cause a Code Type Selection screen to appear. Second, the user can choose to return to the beginning, which causes the opening screen 34 to appear. Third, the user can choose to return to the site selection screen 42.

The Code Type Selection screen 80 is shown in FIG. 7, and allows the user to select the code level to be loaded onto the chassis. A default selection will load the most recently released version onto the chassis. The user must select the appropriate span type for each span. The selection will cause different Span Parameter Setting screens to appear. The span settings must be set correctly before placing work in the queue. FIG. 8 illustrates the span type setting screen 82. Each span type requires different parameter settings, which must be manually set. FIGS. 9*a*–9*e* are Span Parameter Setting screens 84*a*–84*e* for each of the five span types. FIG. 9*a* shows a span parameter setting screen 84*a* for a quad T1 span type. FIG. 9*b* shows a span parameter setting screen 84*b* for a quad E1 span type. FIG. 9*c* shows a span parameter setting screen 84*c* for a quad PRI span type. FIG. 9*d* shows a span parameter setting screen 84*d* for a HDM T1 span type. FIG. 9*e* shows a span parameter setting screen 84*e* for a HDM PRI span type.

Figure 11:
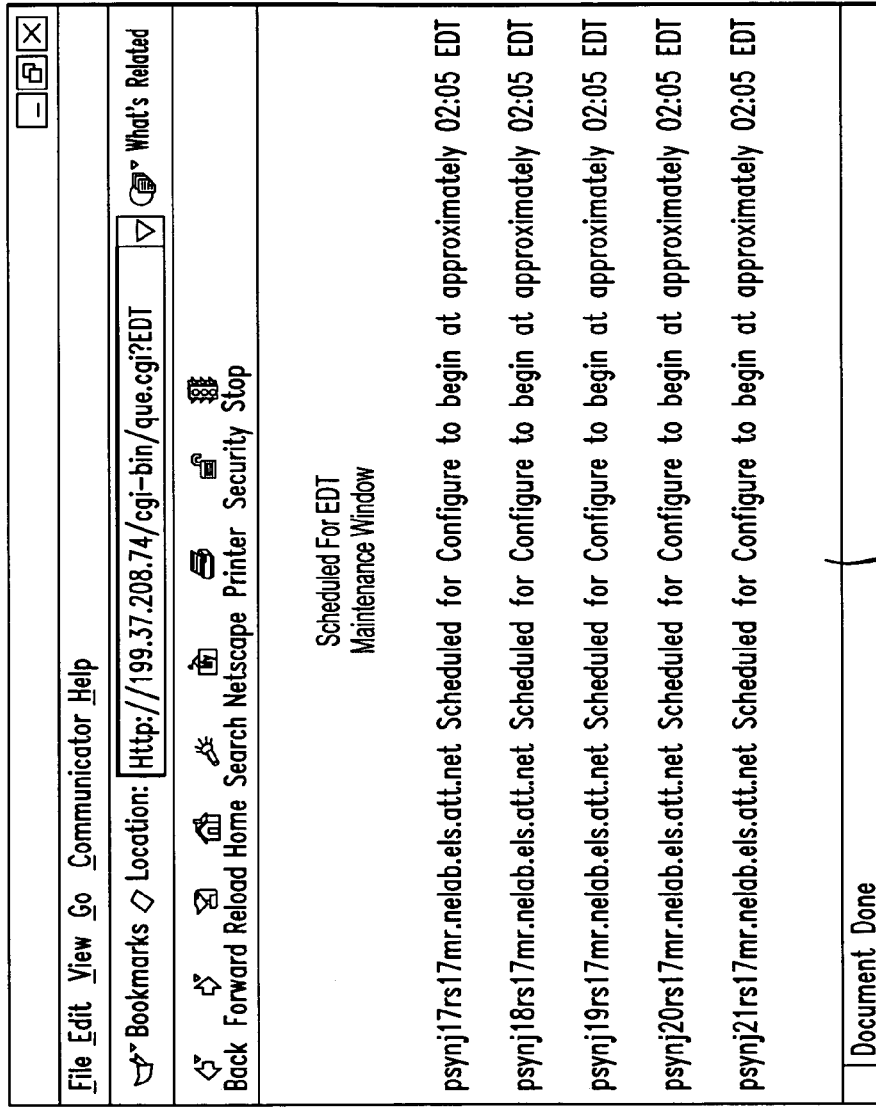
FIG. 11 is a maintenance screen for the view queue process of the flowchart of FIG. 1.

After entering the span information for each of the spans, the user is presented with the logging server screen 90 shown in FIG. 10. The user enters the logging server addresses and the pool address associated with the chassis in the logging server screen 90. The user also selects the priority of the upgrade using a scale of 1 to 5, with 1 being the highest priority. After the user has submitted the foregoing information, the dial platform configuration management system will assign the work the chosen priority and place the task in the queue. An upgrade confirmation screen 92 is then displayed, and is shown in FIG. 11. From the upgrade confirmation screen the user can choose another chassis to configure, or to return to the opening screen 34.

Line 100 in FIG. 1 represents the HARC upgrade. As was the case for the download and configure process, the user must move through the site selection screen 42 and the chassis selection screen 46 to select the site(s) and chassis(s) to be modified. The user then sees the queue question screen 50 to enter the selected sites and chassis into the queue.

At queue time the dial platform configuration management system will load the HARC code with the most recent released version of the code, run the expect configuration scripts, set the trap settings for the HARC and save the settings to the NMC chassis RAM. The HARC card is then reset.

Line 110 in FIG. 1 represents the screens displayed when a user selects the View queue option from the opening screen 34. The view queue option allows the user to see the queue list for each time zone in the USA. When the user selects the view queue option from the opening screen 34, the system for managing the dial platform displays the time zone map screen 120. The six time zones for the USA are displayed in the time zone map screen 120 along with a time zone clock. By selecting any of the time zones, the user can obtain a list of the chassis for that time zoned queued for work and the time the work is to begin, all of which is displayed in the maintenance screen 122 shown in FIG. 11.

Figure 12A:
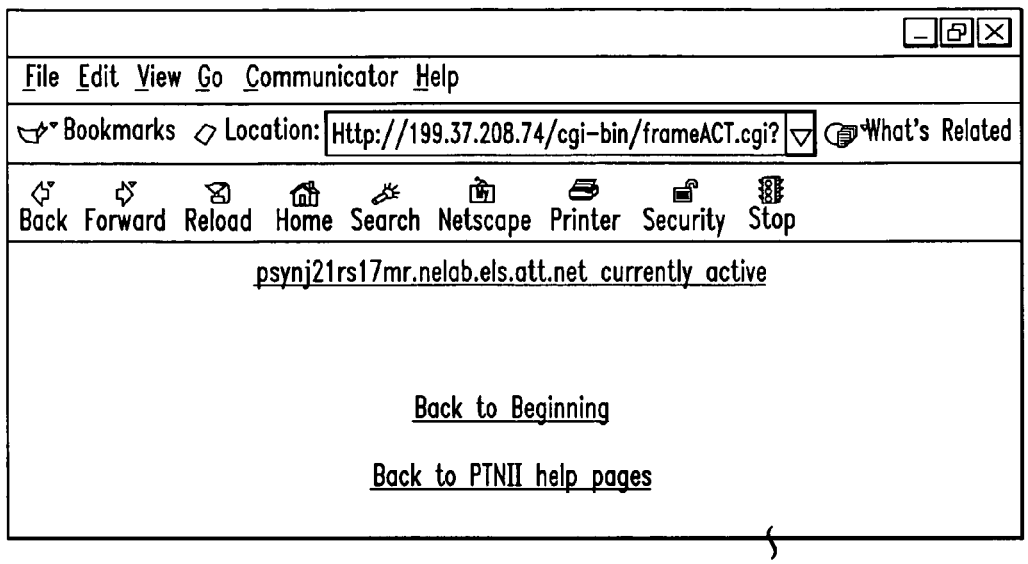
FIGS. 12a and 12b are two view active screens, for when the dial platform configuration management system is working on one chassis and no chassis, respectively, for the view active process of the flowchart of FIG. 1.
Figure 12B:
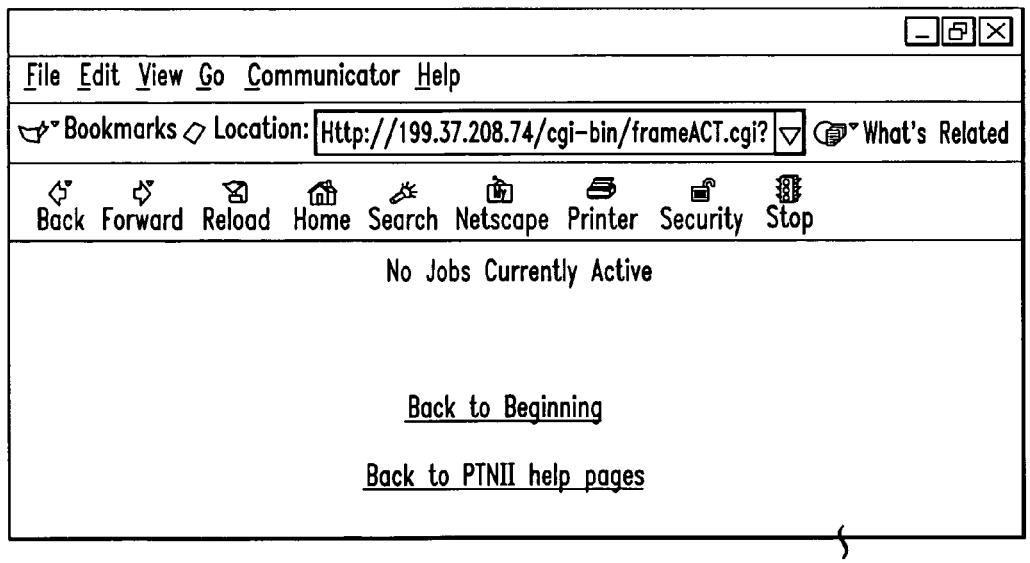

The dial platform configuration management system will list the chassis that are currently being worked on when the user selects the view active option from the opening screen 34 as shown in FIG. 1 by line 126. FIGS. 12a and 12b illustrate two view active screens 122, for when the dial platform configuration management system is working on one chassis and no chassis, respectively.

The last option from screen 34 is the edit queue option and is illustrated by the line 130 in FIG. 1. Through the edit queue option, the user can remove chassis from the queue using the queue edit finished list screen 132.

Figure 13A:
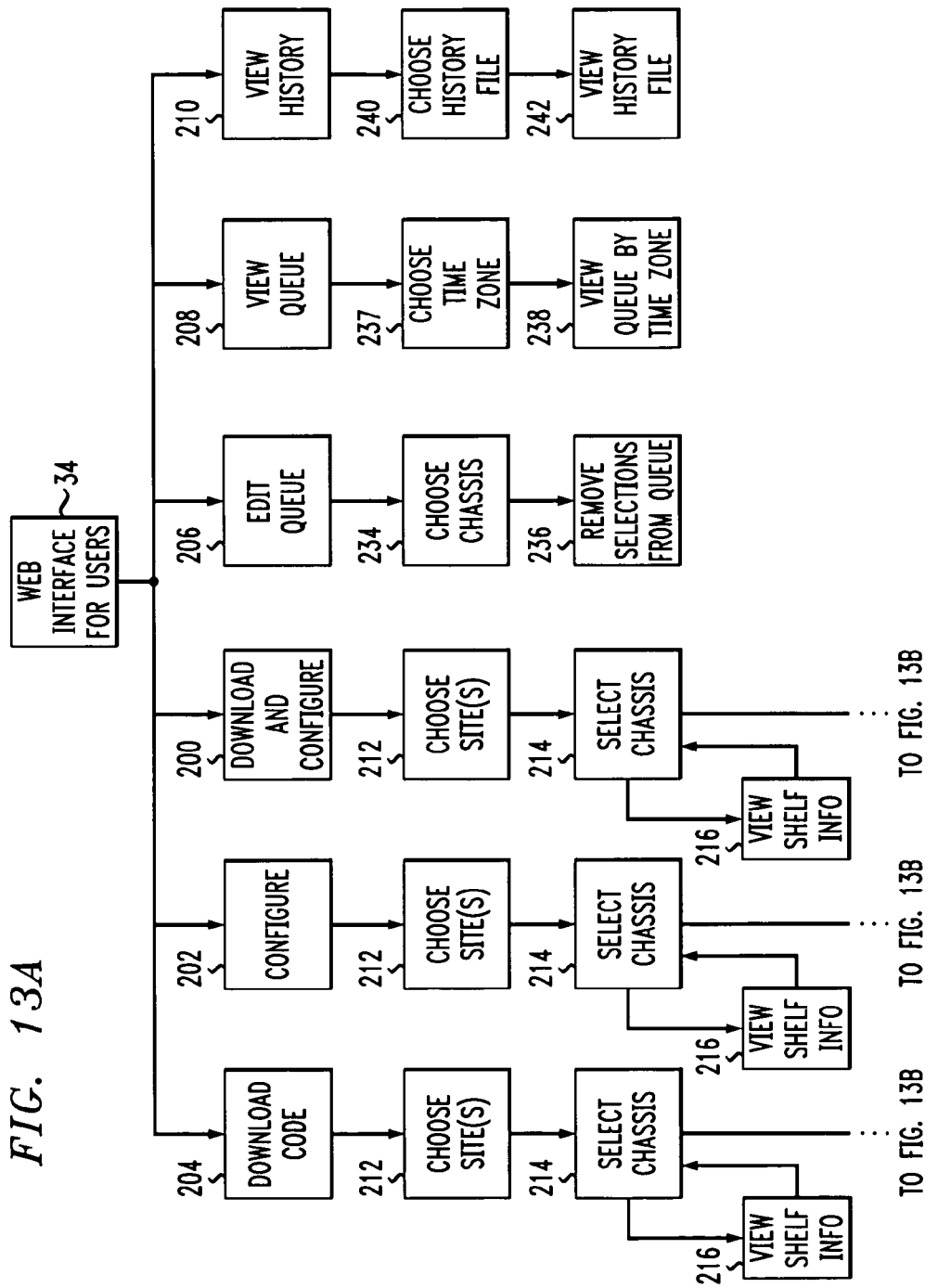
FIG. 13 is flow chart of the operation of the dial platform configuration management system with regard to the options presented in the main or opening screen according to the present invention.
Figure 13B:
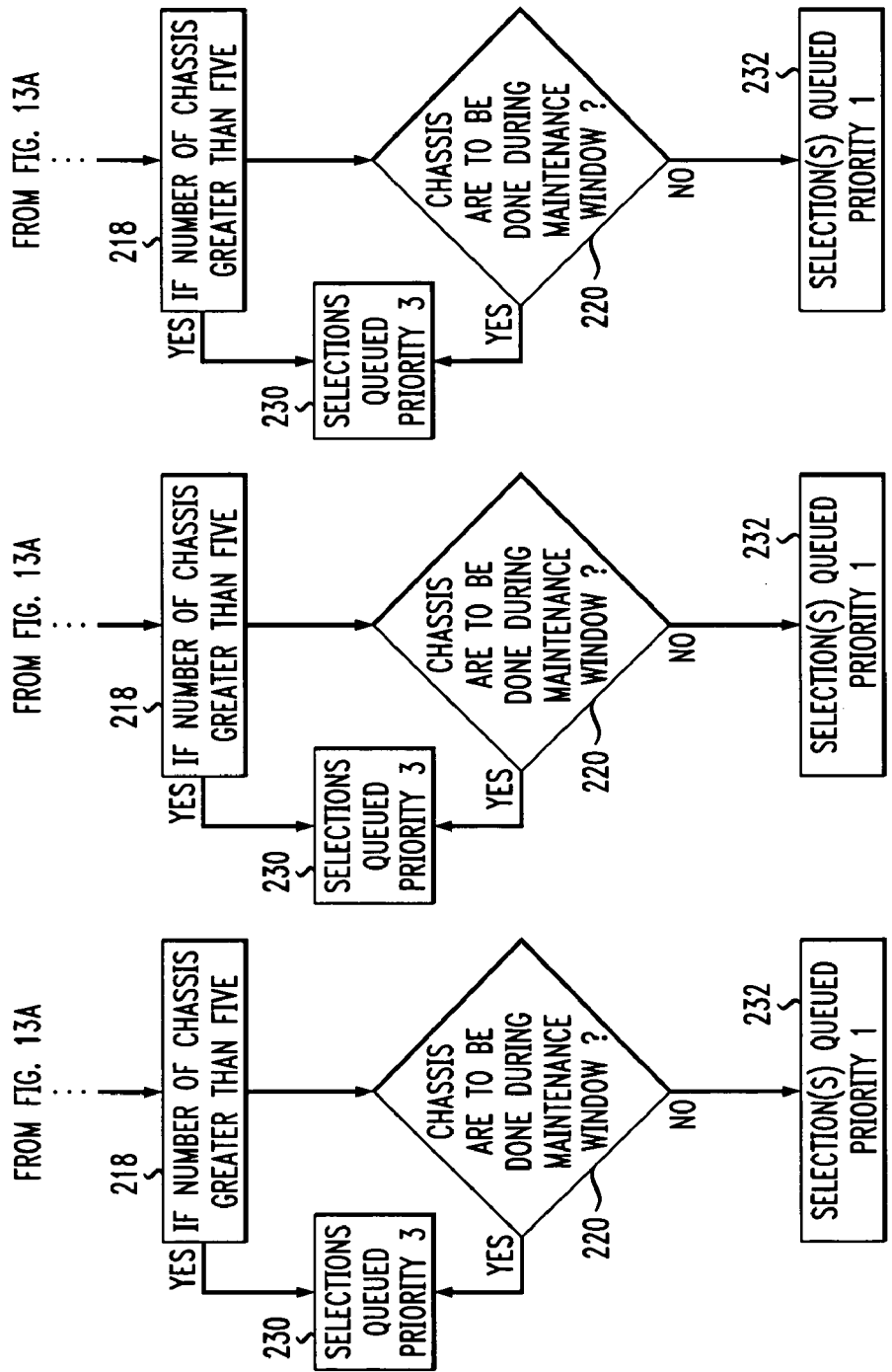

Referring to FIG. 13, a flowchart of the operation of the dial platform configuration management system with regard to the options presented in the main or opening screen is illustrated. The web interface is the same as the opening screen 34 in FIG. 1. From the web interface 34, the user can select any of the six options, namely download and configure 200, configure 202, download 204, edit queue 206, view queue 208 and view history 210.

For download and configure 200, configure 202, and download 204 the next step is to choose or select the sites to be worked on in step 212. After the user has selected a site in step 212, the user then selects the chassis to be worked on in step 214. From the chassis selection step 214, the user can view the information for that chassis in step 216 or add the selections to the queue in either steps 230 or 232, as explained below. After viewing the chassis information in step 216, the user will return to the chassis selection step 214.

From the chassis selection step 214, the selected shelves are added to the queue depending on the number of shelves selected and whether the shelves are to be worked on during the maintenance window as outline below. In step 218, a determination is made as to the number of shelves selected. If the number of shelves is more than five, then the selections are queued with a priority of 3 in step 230. In step 220 a determination is made as to whether the work, to be done on the shelves is to be performed during the maintenance window. If the work is to be done during the maintenance window, then the selections are once again queued with a priority of 3 in step 230. If the work is not done during the maintenance window, then the selections are queued with a priority of 1 in step 232.

If the user chooses the edit queue option 206, then the user proceeds to the choose Chassis step 234. The user then can remove selections from the queue in step 236. If the view queue option 208 is selected the user then enters the choose time zone step 237 which will then lead to the view queue by time zone step 238. Finally, the view history option 210 leads the user to the choose history file step 240, which in turn leads to the view history file step 242.

Figure 14A:
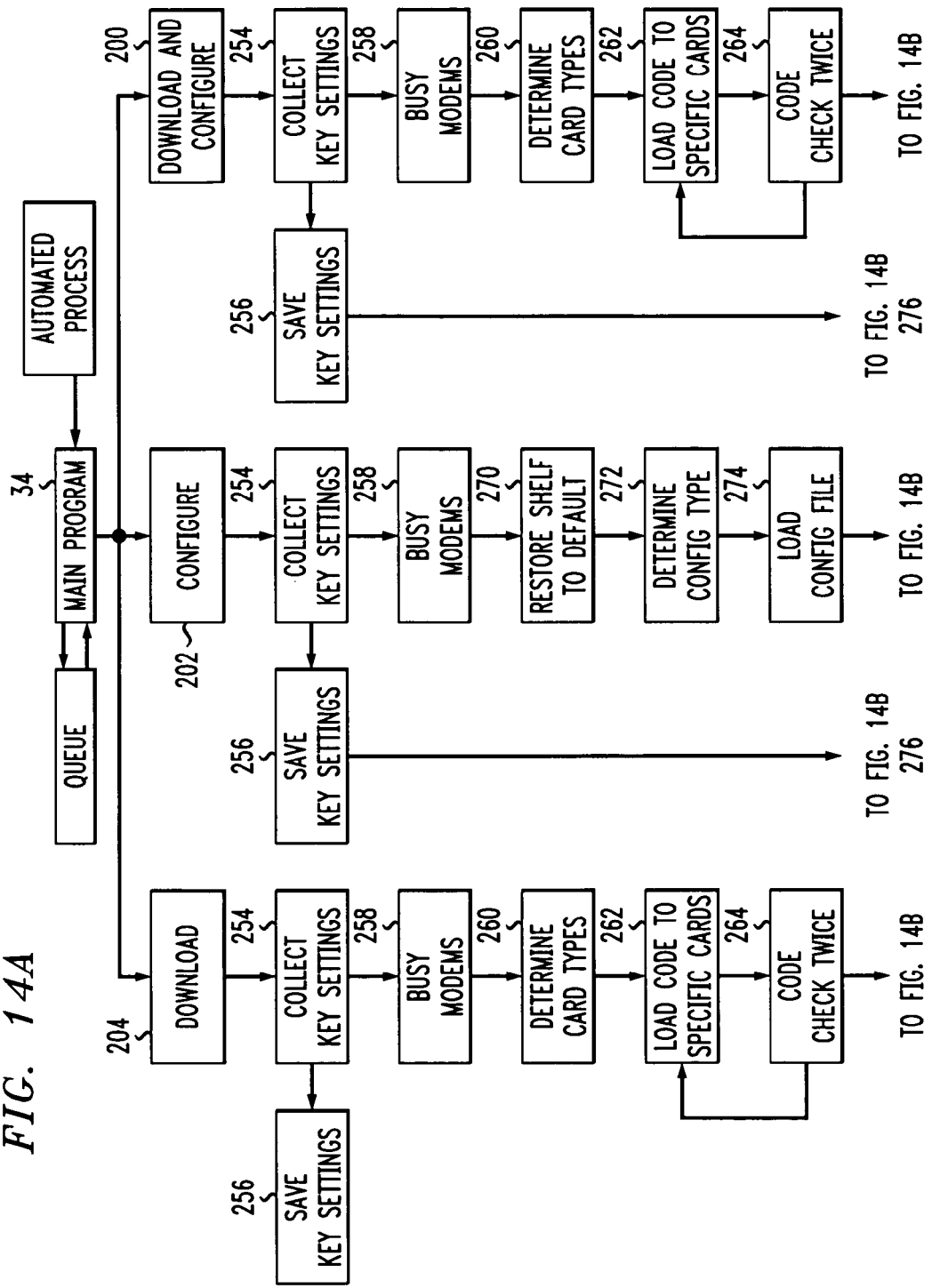
FIG. 14 is flow chart of the operation of the automated processes of the dial platform configuration management system according to the present invention.
Figure 14B:
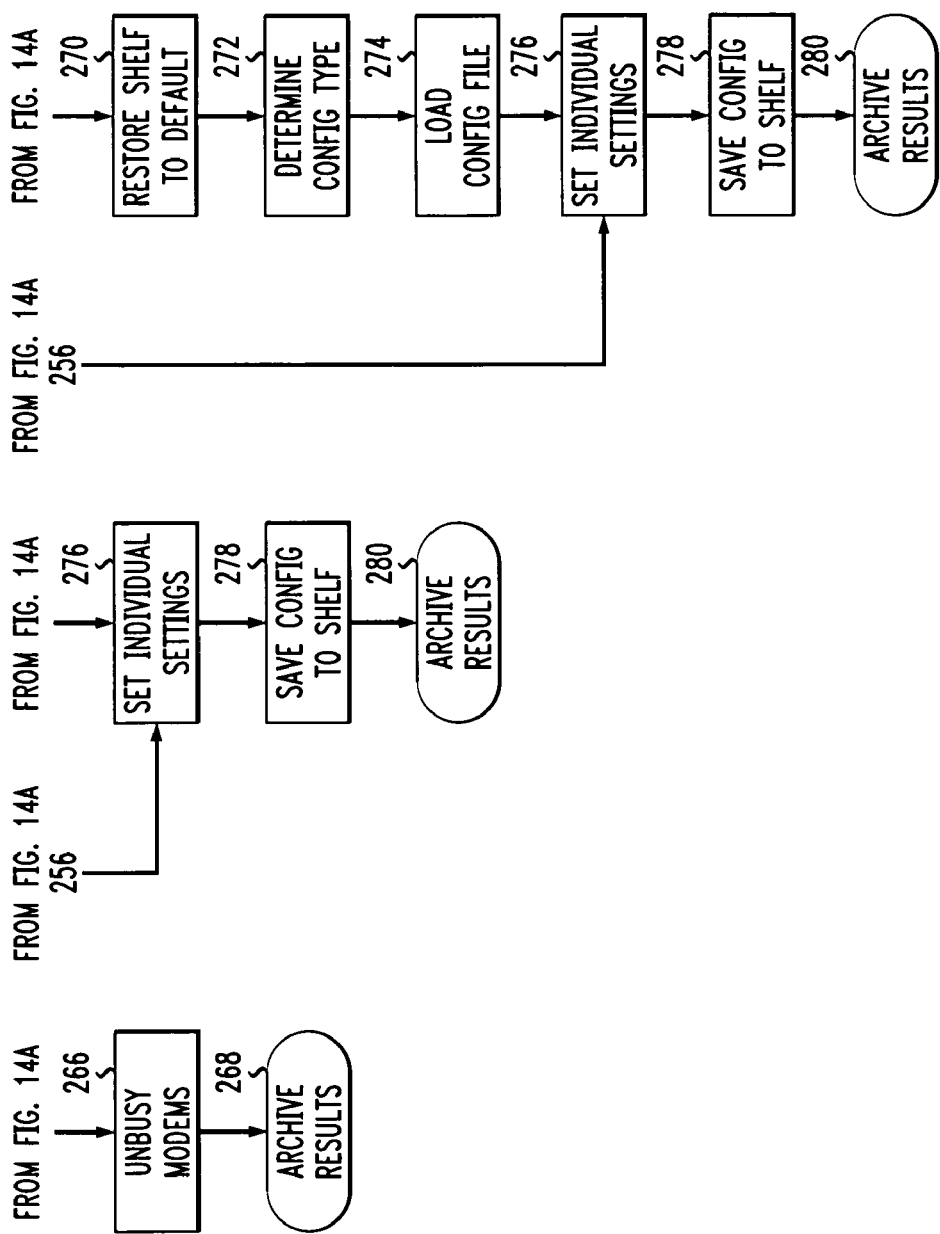

Referring to FIG. 14, a flow chart of the operation of the automated processes of the dial platform configuration management system is shown. The main program 250 send and receive information from the queue 252. This occurs when any of the six options are followed to their end without being aborted. The view queue, view active and edit queue options all involve the interaction with the queue.

For the download option 204, the configure option 202, and the download and configure option 200, automated processes follow different paths. For the download option 204, the system first collects the key settings in step 254 and saves the key settings in step 256. The system then commandeers the selected modems so that the selected modems are unavailable to all other elements of the network in step 258. In step 260 a determination of the types of card selected is made. Code is then loaded to the specific cards, in step 262. The loaded code is checked twice in step 264. If an error in the loaded code is detected in step 264, the system repeats step 262. The modems are then released or designated un-busy in step 266. The results are archived in step 268.

Similar to the download option 204, for the configure option 202, the system first collects the key settings in step 254 and saves the key settings in step 256. The system then commandeers the selected modems so that the selected modems appear to be busy to all other elements of the network in step 258. In step 270 the system restores the chassis to the default settings. Next, the system determines the configuration type in step 272, and then loads the configuration file in step 274. Next, the system sets the individual settings in step 276. The key settings that were saved in step 256 are utilized in step 276. The configuration is then saved to the chassis in step 278, and the results are archived in step 280.

The last option is the download and configure option 200, which follows the same steps 254–264 as the download option 204. After checking the loaded code twice in step 264 the system follows steps 270–280 that were set forth above for the configure option 202.

The work to be done on the chassis is given a priority level in the queue. Every five minutes the dial platform configuration management system will begin the tasks in the queue having a priority 1 level up to a predetermined limit. At the beginning of the maintenance window for each time zone, the dial platform configuration management system starts the highest priorities first, i.e., the lowest priority numbers. Priority 1 is the highest priority, and all tasks assigned the level of priority will take precedence over lower priorities. Tasks with a level 1 priority are the only tasks that are performed during and outside of the maintenance window. Priority 2 level tasks take precedence over priority 3 level tasks. Once a task reaches priority 2 status, it remains there until completed or is removed from the queue. Priority 3 tasks take precedence over priority 4 tasks. Priority 4 tasks take precedence over priority 5 tasks. After a task has remained at priority 3, 4 or 5 for three days, the dial platform configuration management system advances the task to the next highest level, i.e., 2, 3, or 4, respectively.

When five or less chassis are placed in the queue at one time, that action is given a priority 1 level unless specified to be run during the maintenance window in which case a priority 3 level is given. For six to 100 chassis placed in the queue at one time a priority three is assigned. Finally, for more than 100 chassis placed in the queue at one time, a priority 5 is assigned.

The dial platform configuration management system is designed to perform all non-priority 1 tasks, and some priority 1 tasks, during a maintenance window. The maintenance window is the period of time where there is the minimum amount of use of the chassis in that time zone. It has been determined that the chassis are used the least between the hours of 3 AM and 5 AM, and this is therefore the maintenance window for each time zone.

Having described several embodiments of the dial platform configuration management system in accordance with the present invention, it is believed that other modifications, variations and changes will be suggested to those skilled in the art in view of the description set forth above. It is therefore to be understood that all such variations, modifications and changes are believed to fall within the scope of the invention as defined in the appended claims.

What is claimed is:

1. A method of dial platform configuration management for a dial platform coupling a dial-up Public Switched Telephone network and an Internet Protocol network, in which said dial platform comprises multiple chassis, each of said multiple chassis having a plurality of slots containing a plurality of cards, said plurality of cards having at least one modem thereon, comprising the steps of:

selecting an action including downloading code to at least one of said multiple chassis, configuring said at least one of said multiple chassis, and downloading and configuring said at least one of said multiple chassis;

choosing a site at which said at least one chassis is located;

selecting at least one chassis at said site;

placing said at least one chassis at said site in a queue for subsequent execution of said selected action;

executing said selected action;

determining a priority for said selected action, wherein:
said priority is determined by how many chassis are selected; and
if more than five chassis are selected the selected action is given an average priority.

2. A method of dial platform configuration management for a dial platform coupling a dial-up Public Switched Telephone network and an Internet Protocol network, in which said dial platform comprises multiple chassis, each of said multiple chassis having a plurality of slots containing a plurality of cards, said plurality of cards having at least one modem thereon, comprising the steps of:

selecting an action including downloading code to at least one of said multiple chassis, configuring said at least one of said multiple chassis, and downloading and configuring said at least one of said multiple chassis;

choosing a site at which said at least one chassis is located;

selecting at least one chassis at said site;

placing said at least one chassis at said site in a queue for subsequent execution of said selected action;

executing said selected action;

determining a priority for said selected action, wherein:
said priority is determined by how many chassis are selected; and
if five or less chassis are selected, and the selected activity is not to be performed in a maintenance window during which platform use is at a minimum, said selected action is given a highest priority.

3. A system, for managing the configuration of a dial platform coupling a dial-up Public Switched Telephone network and an Internet Protocol network, comprising:

multiple chassis, each of said multiple chassis having a plurality of slots containing a plurality of cards, said plurality of cards having at least one modem thereon;

a server through which actions can be selected, said actions including downloading code to at least one of said multiple chassis, configuring said at least one of said multiple chassis, and to downloading and configuring said at least one of said multiple chassis;

said server maintaining a queue of said actions to be performed at sites where said multiple chassis are located throughout said platform;

said queue having the ability to initiate said selected actions during a maintenance window during which use of said platform is at a minimum, wherein:

said selected actions are prioritized;

said priority is determined by whether said selected actions are to be performed in a maintenance window during which platform use is at a minimum; and if more than five chassis are selected for a selected action, said selected action is given an average priority.

4. A system, for managing the configuration of a dial platform coupling a dial-up Public Switched Telephone network and an Internet Protocol network, comprising:

multiple chassis, each of said multiple chassis having a plurality of slots containing a plurality of cards, said plurality of cards having at least one modem thereon;

a server through which actions can be selected, said actions including downloading code to at least one of said multiple chassis, configuring said at least one of said multiple chassis, and to downloading and configuring said at least one of said multiple chassis;

said server maintaining a queue of said actions to be performed at sites where said multiple chassis are located throughout said platform;

said queue having the ability to initiate said selected actions during a maintenance window during which use of said platform is at a minimum, wherein:

said selected actions are prioritized;

said priority is determined by whether said selected actions are to be performed in a maintenance window during which platform use is at a minimum; and if five or less chassis are selected and the selected activity is not to be performed in a maintenance window during which platform use is at a minimum, said selected action is given a highest priority.

* * * * *